United States Patent

[11] 3,581,300

[72] Inventor Walter G. Eloranta
 1719 Vermont Ave., Fort Wayne, Ind. 46805
[21] Appl. No. 746,158
[22] Filed July 19, 1968
[45] Patented May 25, 1971

[54] ELECTRONIC ACTUATOR AND TIMER CIRCUIT
 4 Claims, 1 Drawing Fig.
[52] U.S. Cl. .................................................. 340/309.1,
 307/252, 307/246, 307/293, 317/148.5,
 340/213.1, 340/322, 340/412
[51] Int. Cl. .................................................. G08b 23/00
[50] Field of Search .......................................... 307/246,
 252, 273, 284, 293, 294; 328/72; 340/43.1, 309.1,
 412, 415, 322

[56] References Cited
 UNITED STATES PATENTS
3,200,306  8/1965  Atkins .......................... 307/252
3,341,717  9/1967  McCracken ................. 307/284

OTHER REFERENCES
G.E. SCR Manual, 10th ed 1967 p-84. Mungenast, "AC Motor Speed Control", Home Appliance Builder Aug. 1964, p-15.

Primary Examiner—Donald D. Forrer
Assistant Examiner—Larry N. Anagnos
Attorney—Jeffers and Young ABSTRACT: A number of actuator circuits, each having a switch and a capacitor connected in series, are connected to a transformer primary winding. The transformer secondary winding is coupled to a controlled rectifier having a timer capacitor connected to its anode-cathode path. An output circuit is coupled to the timer capacitor. Closing of any one of the switches renders the controlled rectifier conductive to charge the timer capacitor, after which the controlled rectifier is turned off so as to be responsive to closing of another switch. The output circuit produces a signal as long as the timer capacitor has a charge.

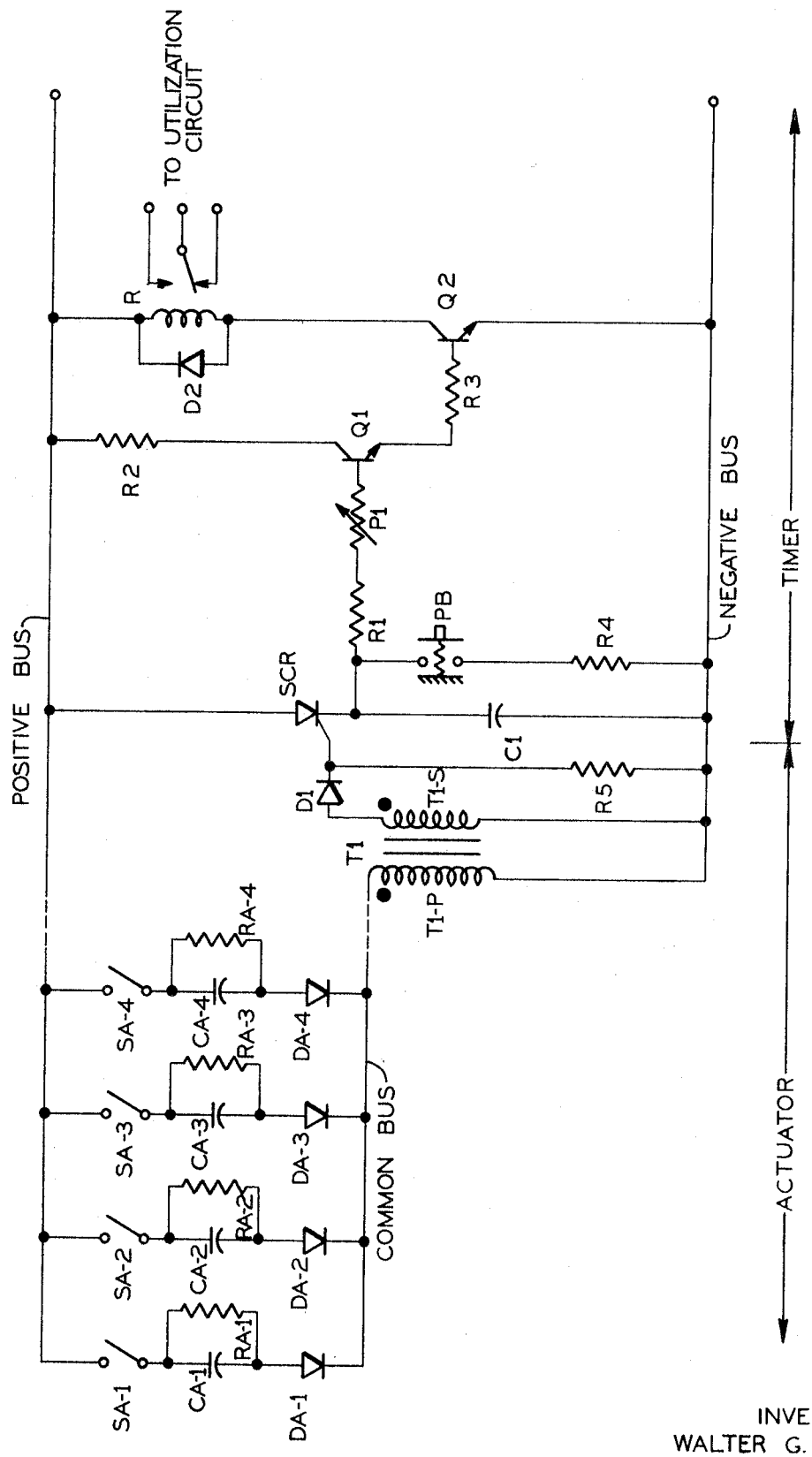
INVENTOR
WALTER G. ELORANTA
BY Jeffers and Young
ATTORNEYS

ELECTRONIC ACTUATOR AND TIMER CIRCUIT

BACKGROUND OF THE INVENTION

My invention relates to an electronic actuator and timer circuit, and particularly to such a circuit that can be repeatedly actuated regardless of the condition of the circuit elements that caused previous actuations.

Electronic circuits are frequently used to sense a certain condition or operation, and to produce a signal in response to such sensing. For example, alarm circuits are provided to sense movement or presence of an object or person, or to sense some other disturbance around a safe, an automobile, or other object of value. GEnerally, it is preferable that the alarm circuit be self-sustaining. That is, the alarm circuit is preferably battery operated, so that it does not depend upon a continuous supply of alternating current power. Alarm circuits have been devised which respond to movement or presence, and which produce a signal in response to such movement or presence as long as there is sufficient battery power. However, such alarm circuits may waste the battery unnecessarily, and may even discharge the battery beyond its rechargeable state. Alarm circuits have also been devised which respond to movement or presence, and which produce an intermittent signal in response to such movement or presence for the purpose of saving the battery power. While such circuits can detect one movement or presence, such circuits can not detect a subsequent movement or presence without being reset. For example, a first movement or presence could be indicated and an alarm given for a timed period, after which the alarm would stop. If no one heard the first alarm and if there were then a second movement or presence, the alarm circuit would not operate. Thus, the necessary alarm might never be given.

Accordingly, an object of my invention is to provide a new and improved electronic actuator and timer circuit.

Another object of my invention is to provide an improved actuator circuit which can have any desired number of individual circuits coupled to a timer circuit, so that operation of any individual actuation circuit will cause the timer circuit to start a timing cycle and produce a signal, regardless of prior actuations and without resetting.

Another object of my invention is to provide a new and improved electronic actuator and timer circuit having a plurality of individual actuation circuits, each of which can cause the timer circuit to operate and produce a timed signal.

SUMMARY OF THE INVENTION

Briefly, these and other objects are achieved in accordance with my invention by an actuator and timer circuit having a plurality of individual actuator circuits each having a series circuit of a switch and a capacitor. The series circuits are coupled to the primary winding of a transformer. The secondary winding of the transformer is coupled to the control electrode of a controlled rectifier having a timer capacitor coupled in its anode-cathode path. Closing of any one of the switches produces a pulse in the transformer which turns the controlled rectifier on and provides a current to charge the timer capacitor. The charged timer capacitor produces a voltage which turns the controlled rectifier off, and which can be used (preferably after amplification) to produce a signal as long as the voltage across the timer capacitor exceeds some selected level. Thus, the signal duration depends upon the capacitor discharge time. If another switch is closed, another pulse is supplied to the controlled rectifier so that the timer capacitor is again charged to produce another signal. Thus, my actuator and timer circuit produces a timed signal in response to each switch actuation, such as provided by movement, presence, or other condition that causes closing of an actuator switch.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

The single FIGURE shows an electrical circuit diagram of a preferred embodiment of my electronic actuator and timer circuit.

DESCRIPTION OF THE PREFERRED EMBODIMENT

My improved electronic actuator and timer circuit is generally divided into two portions: an actuator on the left and a timer on the right as indicated. Both portions operate from a suitable source of direct current (not shown) which is connected to a positive bus and a negative bus.

In the actuator, I have shown four individual actuator circuits, but it is to be understood that more or less actuator circuits could be provided. Each of the actuator circuits includes an operable switch SA. One end of each of the switches SA is connected to the positive bus, and the other end of each of the switches is connected to one side of a respective capacitor CA. Each of the capacitors CA is shunted by a bleeder resistor RA. The other side of each of the capacitors CA is connected to the anode of a respective diode rectifier DA. The cathodes of the diode rectifiers DA are connected to a common bus. The circuit elements for each of the actuator circuits have the same suffix numeral. The actuator portion of my circuit may utilize any suitable type of device for the switches SA. Thus, the switches SA may be capsules of mercury which are motion sensitive, and which close two electrodes on being moved or tilted. Or, the switches may be some photoelectric device which senses presence by interruption of a light beam. The actuator portion may be positioned at any desired location, and may be spaced from the timer portion as indicated by the dashed lines in the positive bus and in the common bus connected to the cathodes of the diode rectifiers DA.

The common bus in the actuator portion is connected to one end of a primary winding T1–P of the transformer T1. The other end of the primary winding T1–P is connected to the negative bus. A secondary winding T1–S is coupled to the primary winding T1–P with the relative polarities indicated by the dots. The transformer T1 is preferably a pulse-type transformer that produces a rapidly rising pulse at its secondary winding T1–S in response to current flow in its primary winding T1–P. The secondary winding T1–S has one end connected to the negative bus, and has its other end connected through a diode rectifier D1 to the control or gate electrode of a controlled rectifier SCR, which may be any suitable type such as a silicon controlled rectifier. The anode-cathode path of the controlled rectifier SCR is coupled to a timer capacitor C1. Specifically, the anode is coupled to the positive bus, and the cathode is connected to one side of the timer capacitor C1. The other side of the timer capacitor C1 is connected to the negative bus. The timer capacitor C1 is shunted by a reset circuit having a reset pushbutton PB and a resistor R4. A stabilizing resistor R5 is connected between the control electrode of the controlled rectifier SCR and the negative bus. Voltage on one side of the timer capacitor C1 is applied through a resistor R1 and a potentiometer P1 to an amplifier. The amplifier includes an NPN-type transistor Q1 and an NPN-type transistor Q2 which are normally biased off. The collector of the transistor Q1 is connected through a resistor R2 to the positive bus, and the emitter of the transistor Q1 is connected through a resistor R3 to the base of the transistor Q2. The collector of the transistor Q2 is coupled through an indication device such as the winding of a relay R to the positive bus, and the emitter of the transistor Q2 is connected to the negative bus. The winding of the relay R may be shunted by a voltage suppressing diode rectifier D2. I have shown only one movable contact and two fixed contacts associated with the relay R, but it is to be understood that the relay R may have any desired contract configuration and operation.

When the circuit of my invention is operated, the positive and negative buses are connected to a suitable source of direct current, such as a storage battery. The actuator switches SA are suitably positioned and arranged to sense the desired activity such as movement or presence. The contacts of the relay R have the position shown, and this may be utilized to provide a safe indication. If one of the switches SA is operated, for example the switch SA–1, current flows from the positive bus through this closed switch SA–1, through the capacitor CA–1, through the diode rectifier DA–1, and through the primary winding T1–P until the capacitor CA–1 charges. This current flow produces a pulse at the secondary winding T1–S so that the controlled rectifier SCR is turned on to allow current to flow in its anode-cathode path. When the controlled rectifier SCR is turned on, current flows from the positive bus, through the anode-cathode path and the timer capacitor C1, to the negative bus. When the voltage across the timer capacitor C1 reaches a selected magnitude, the transistor Q1 is turned on, and this in turn causes the transistor Q2 to be turned on. With the transistor Q2 turned on, current may flow through the winding of the relay R and cause the contacts to switch. This changed condition may be utilized to provide any sort of indication or alarm, such as operation of a bell or lamp. As long as the voltage across the timer capacitor C1 has sufficient magnitude, the transistors Q1, Q2 stay turned on to energize the winding of the relay R. As the timer capacitor C1 discharges, a point will be reached where the transistors Q1, Q2 are again turned off and the winding of the relay R is deenergized. If, at this time, the switch SA–1 is still closed, nothing further happens. However, if one of the other switches closes, say the switch SA–2, this switch SA–2 provides a current which produces a pulse in the secondary winding T1–S. This pulse will again turn on the controlled rectifier SCR to charge the timer capacitor C1. Thus, a second alarm will be produced. Closing of other switches, such as the switch SA–3 or the switch SA–4, will also produce the same alarm. If a switch is subsequently closed while the timer capacitor C1 still has a charge, the controlled rectifier SCR will be rendered conductive long enough to again fully charge the timer capacitor C1.

If, during the time period of an indication or alarm, an operator comes to the location, he may turn the alarm off by momentarily depressing the reset pushbutton PB. This provides a discharge path for the timer capacitor C1 through the resistor R4.

It will thus be seen that my invention provides a new and improved battery operated, electronic actuator and timer circuit which is particularly useful to provide a timed indication or alarm in response to one or more actuations of the actuator switches. A circuit such as shown in the FIGURE was actually built and operated with the following circuit values:

| | |
|---|---|
| Direct Current Voltage | 12 volts |
| Capacitor CA | 20 microfarads |
| Resistor RA | 120,000 ohms |
| Diode Rectifier DA | Type 1N34A |
| Transformer T1 | Turns ratio: 2.24 to 1 |
| Diode Rectifier D1 | Type 1N34A |
| Controlled Rectifier SCR | GE type C106B1 |
| Timer Capacitor C1 | 100 microfarads |
| Resistor R1 | 1 megohm |
| Potentiometer P1 | 1 megohm |
| Transistor Q1 | Type 2N3394 |
| Transistor Q2 | Type 2N697 |
| Resistor R2 | 2,200 ohms |
| Resistor R3 | 22,000 ohms |
| Resistor R4 | 1,000 ohms |
| Resistor R5 | 1,000 ohms |
| Diode Rectifier D2 | Type F2 |

The relay coil had a resistance of 450 ohms, and operated in response to a current of 6.5 milliamperes, and dropped out at a current of 4.0 milliamperes. With the above circuit values, closing of any one of the actuator switches SA caused the alarm circuit to operate for approximately 10 minutes. The timer capacitor C1 was then increased to 700 microfarads, and when an actuator switch SA was operated, the alarm circuit operated for approximately 60 minutes.

While I have shown and described only one embodiment, persons skilled in the art will appreciate that modifications may be made. For example, the current or voltage amplifying circuit comprising the transistors Q1, Q2 may be modified so that only one transistor is used, or so that one or two PNP-type transistors, with corresponding circuit changes, are used. The actuator and timer may be operated from separate power supplies or at different voltage levels from a common power supply. The adjustable potentiometer P1 may have any desired range of values, but it is desirable to keep the resistor R1 so as to have a minimum time constant for discharging the timer capacitor C1. Likewise, the timer capacitor C1 may be variable. And as already mentioned, the actuator switches SA may take various configurations. Therefore, while my invention has been described with reference to a particular embodiment, it is to be understood that modifications may be made without departing from the spirit of the invention or from the scope of the claims.

What I claim as new and desire to secure by Letters Patent of the U.S. is:

1. An improved actuator and timer circuit, comprising:
    a. positive and negative buses adapted to be connected to a source of direct current;
    b. a plurality of actuator circuits each comprising a normally open but operable switch connected in a series circuit with a capacitor and resistor connected in parallel;
    c. a pulse transformer having a primary winding and a coupled secondary winding;
    d. means connecting said primary winding in series with all of said series circuits between said positive bus and said negative bus;
    e. a controlled rectifier having an anode, a cathode, and a control electrode;
    f. a timer capacitor;
    g. means connecting said anode of said controlled rectifier to said positive bus;
    h. means connecting said timer capacitor between said cathode of said controlled rectifier and said negative bus;
    i. means connecting said secondary winding of said pulse transformer between said control electrode of said controlled rectifier and said negative bus;
    j. current amplifying means comprising at least one transistor having an emitter, a base, and a collector;
    k. means connecting the emitter-collector path of said transistor between said positive bus and said negative bus;
    l. a timer resistor connected at one end to the connecting means of said cathode of said controlled rectifier and said timer capacitor, and connected at the other end to said base of said transistor;
    m. and indicating means connected in series with said emitter-collector path of said transistor for producing an output signal.

2. The improved actuator and timer circuit of claim 1, and further comprising a reset circuit coupled across said timer capacitor.

3. The improved actuator and timer circuit of claim 1 wherein said timer resistor is variable.

4. The improved actuator and timer circuit of claim 3, and further comprising a reset circuit coupled across said timer capacitor.